May 28, 1968  J. W. FARGO ET AL  3,385,106
METHOD AND MEANS FOR DETECTING SAG IN A SHEET
Filed June 30, 1966  4 Sheets-Sheet 1
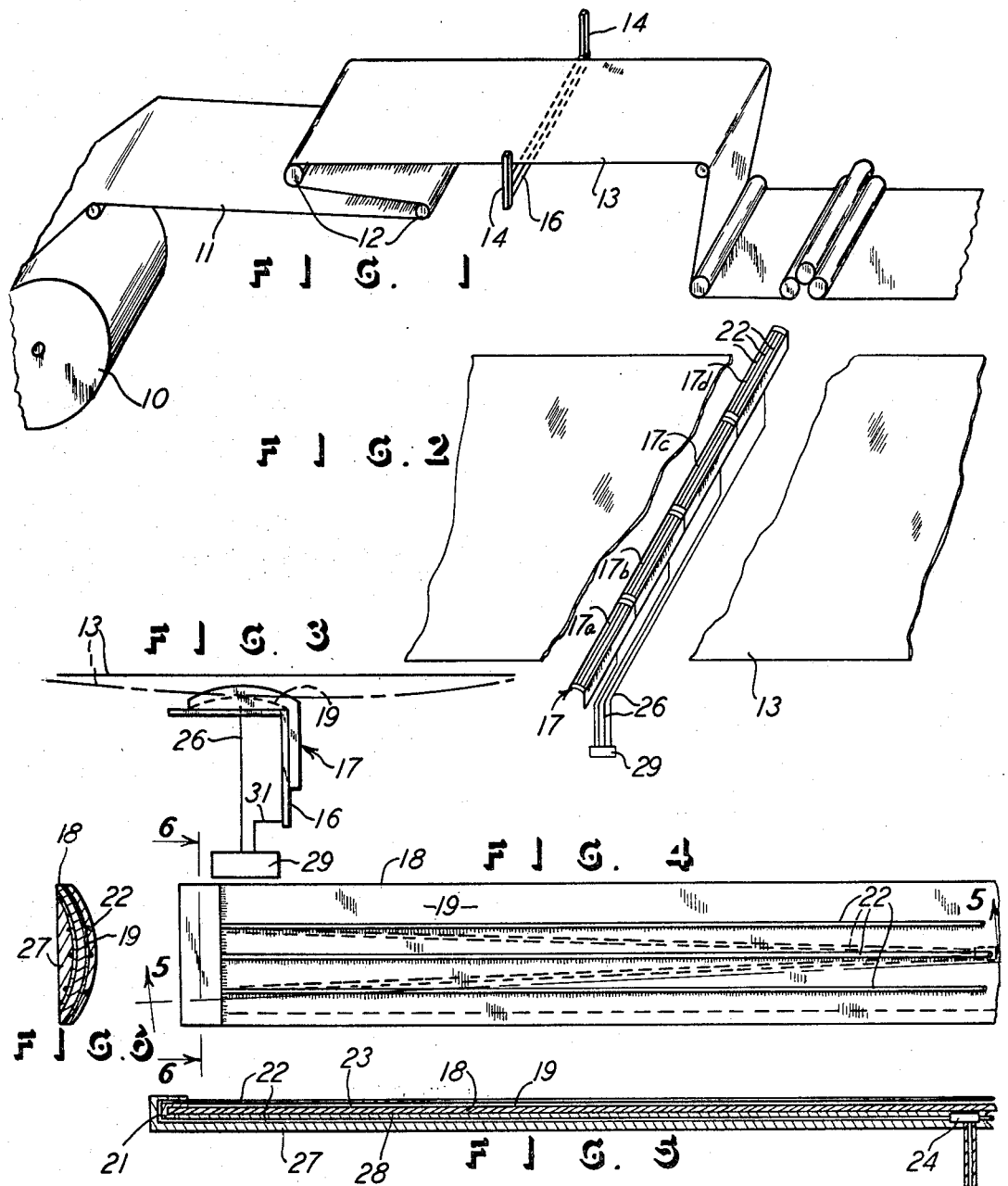
INVENTORS,
JAMES W. FARGO,
THOMAS W. FARGO,
ROBERT E. WOOD
Arthur J. Hansmann
ATTORNEY

INVENTORS,

JAMES W. FARGO,
THOMAS W. FARGO,
ROBERT E. WOOD

ATTORNEY

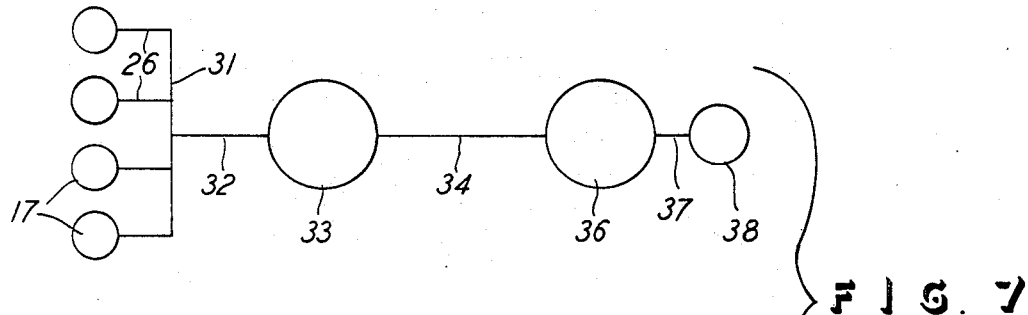
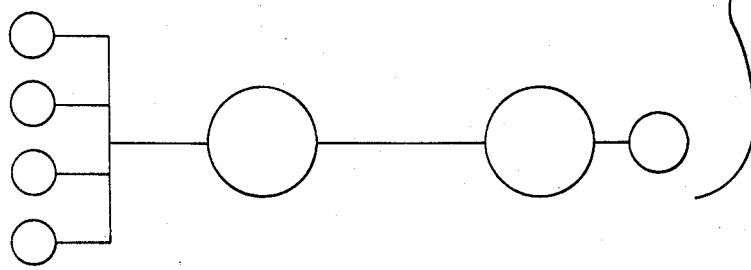
FIG. 7
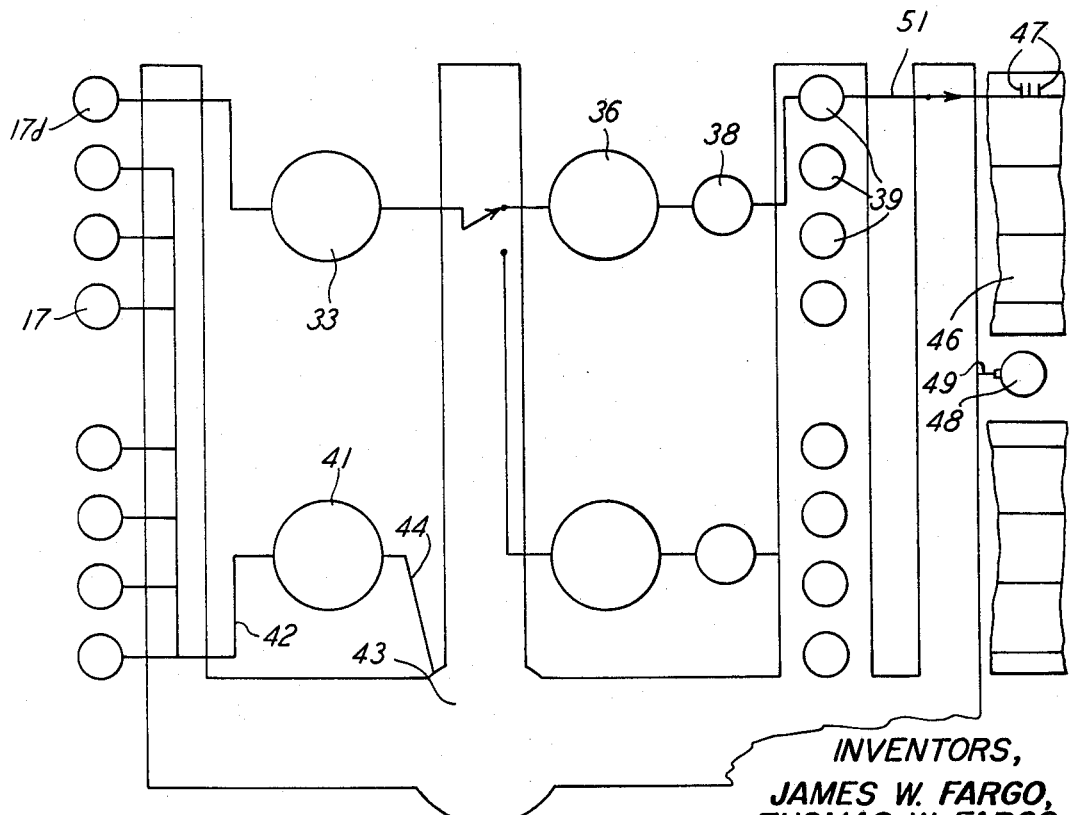
FIG. 8

May 28, 1968  J. W. FARGO ET AL  3,385,106
METHOD AND MEANS FOR DETECTING SAG IN A SHEET
Filed June 30, 1966  4 Sheets-Sheet 4
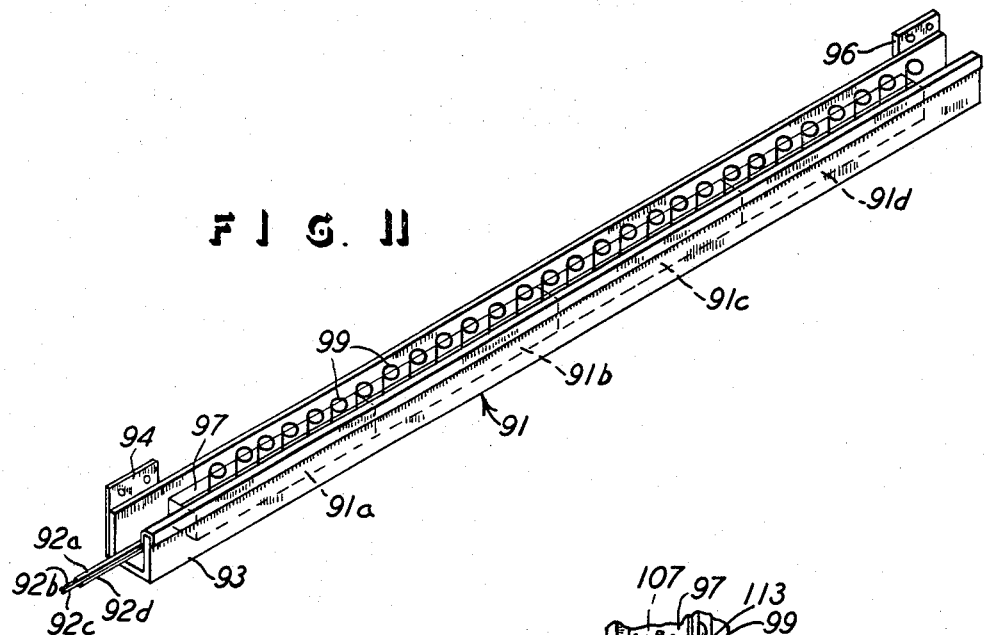
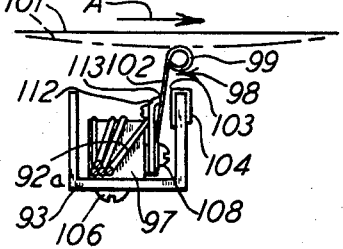
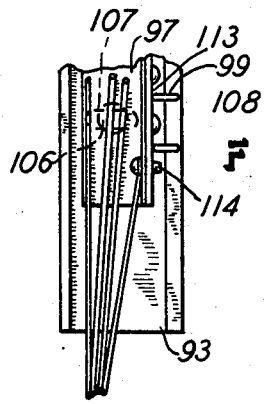
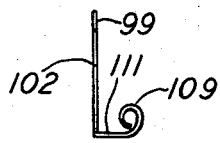
INVENTORS:
JAMES W. FARGO
THOMAS W. FARGO
ROBERT E. WOOD
ATTORNEY

United States Patent Office 3,385,106
Patented May 28, 1968

3,385,106
METHOD AND MEANS FOR DETECTING SAG IN A SHEET
James W. Fargo, Kenosha, and Thomas W. Fargo and Robert E. Wood, Racine, Wis., assignors to Western Publishing Company, Inc., Racine, Wis., a corporation of Wisconsin
Filed June 30, 1966, Ser. No. 563,929
10 Claims. (Cl. 73—159)

ABSTRACT OF THE DISCLOSURE

Method and means for detecting sag in a sheet wherein sensors are dispensed below the sheet and separately across the width of the sheet for detecting the portion of the sheet which may sag. The sensors are shown to be electrically operative, and signalling means and recording means are connected with the sensors for showing and recording the sag and the location thereof.

---

This invention relates to a method and means for detecting sag in a sheet, such as a web of paper moving into a printing press, or having like movement.

With regard to the use of this invention in the instance where a web of paper is to be monitored for sag, it is common knowledge that rolls of paper, such as those used in large printing presses, are not uniform in their structure. Irregularities in the paper affect the printing process, including the speed and quality of the printing. In some instances, one side of a web of paper may be thinner than the other side, and the paper will then be stretched when it is positioned in a roll at the paper mill. This irregularity in the paper affects web tension in the printing press, and, as such, it is undesirable.

With this invention, the paper mill will know the quality of paper it has made, and it will thereby be able to improve on the quality. In this regard, it is also possible with this invention to detect the location, in both the length and the width of the web of paper, of any sag or like irregularity in the paper itself. Of course likewise, the printer will be able to monitor or detect sag in paper so that he too will be aware of the quality of the paper. In the instance of a printer, the sag can be detected at the very same time that the paper is being fed into the printing press, and thus no extra operation or unwinding of the paper roll need be carried out, and this is an advantage and object of this particular invention.

It is a general object of this invention to provide a method and apparatus for detecting sag in a sheet, such as a web of paper. Further, it is an object and an advantage of this invention that the sag can be detected while the sheet is moving, such as when the web of paper is moving into a printing press, or when it is moving off the paper making machine and is being rolled up.

Still another object of this invention is to provide a method and apparatus for detecting sag in a sheet, and to signal, record, and locate the sag in the sheet. In accomplishing this particular object, it is possible that a visual type of signal as well as a permanent recording can both be made with the apparatus of this invention.

Still further, it is an object of this invention to provide a method and means of generally detecting sag in a sheet, and subsequently to specifically locate the position of the sag, and all may be done while the sheet is moving in its normal plane or edgewise. Thus, the method and apparatus permit monitoring of the sheet, recording of the occurrences of sag, signaling of the occurrences, obtaining the total count for the occurrences, and all may be accomplished on one or more webs at the same time, such as when a printing press is normally operating with two webs being fed into it.

Still other objects of this invention include the provision of a method and means for detecting sag in a web of paper and to do so with a very accurate and reliable method and means but yet to have the means or apparatus relatively simple to operate, inexpensive, and easy to maintain, and to have only a minimum of disturbance or contact with the paper itself so that neither the paper nor the apparatus is subject to wear or requires any special consideration.

FIG. 1 is a side perspective view of a web of paper which may be in the process of being fed into a printing press, and showing the support or mounting for a portion of this apparatus.

FIG. 2 is an enlarged perspective view of the web of paper, broken away, and showing the sensor portion of the apparatus.

FIG. 3 is a diagrammatic and side elevational view of the apparatus as related to a web of paper which is shown in its normal plane by a solid line and is shown in a sagging position by a dot-dash line.

FIG. 4 is an enlarged top plan view of a portion of FIG. 2.

FIG. 5 is a sectional view taken on the line 5—5 of FIG. 4.

FIG. 6 is a sectional view taken on the line 6—6 of FIG. 4.

FIG. 7 is a diagrammatic view of a portion of this apparatus.

FIG. 8 is a diagrammatic view of FIG. 7 with additional apparatus and components therein.

FIG. 11 is a perspective view of a preferred embodiment of the sensor.

FIG. 12 is an end elevational view of FIG. 11, with the paper web added.

FIG. 13 is a top plan view of a fragment of FIG. 11.

FIG. 14 is a side elevational view of the feeler of the sensor in FIGS. 11–13.

Figure 9:
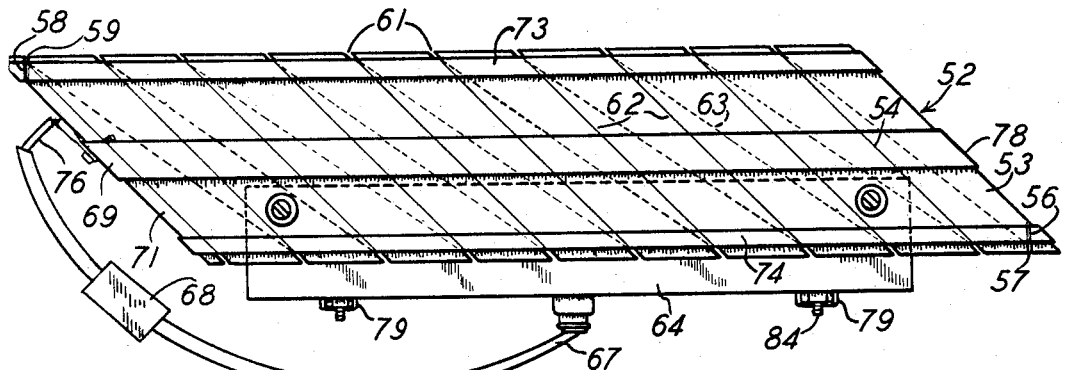
FIG. 9 is a top plan view of another embodiment of the sensor portion of this invention.

FIG. 1 shows a roll of paper 10 which is providing the paper web 11 trained over the rollers 12 to move from left to right as viewed in FIG. 1. The central portion 13 of the paper web is planular, and is thus considered to be moving edgewise along its length. Two standards 14 are shown adjacent the web portion 13, and a support 16 is suitably connected to the standards 14. The support 16 thus extends below the plane of the web portion 13 and across the width of the web.

The support structure 14 and 16 provides a mounting for the sensor generally designated 17 and shown in FIGS. 2–5. FIG. 2 also shows the web of paper 13, with the central portion broken away to show the relative location of the sensor 17.

The sensor 17 is shown to be made in four sections, with each section identified separately as 17a, section 17b, section 17c, and section 17d. The four sections of course provide the complete span across the width of the paper web. In this manner, the apparatus will operate to indicate which of the four sensors is detecting paper sag, and accordingly, the operator will then known the location of the sag, that is, whether it be above sensor 17a, or sensor 17b, or sensor 17c, or sensor 17d. Also, of course one or all of the four sensors could be operative at any one time to all signal and record sag by means described hereinafter.

Thus the sensors 17 are supported on the mounting bar 16, as indicated in FIG. 3, and the sensors are spaced below the plane of the web of paper but within a limit to which it is desired to detect sag in the paper. Thus, FIG.

3 shows in an upper solid line the normal planular position of the paper web 13, and the lower dot-dash line shows the location of the paper web 13 when it is sagging. The lower or sagging position of the paper 13 causes the latter to actuate the sensor 17.

FIGS. 4, 5, and 6, show the details of the sensor 17, and here it will be noted that the sensor includes an upper portion 18 having a top portion 19. The surface 19 is shown to be curved in FIG. 3, and also in FIG. 6.

Each end of the member 18 has an electrical insulator 21 extending thereover, and three electrical conductors or wires 22 are stretched over the opposite ends of the member 18 as shown. The three wires 22 are spaced above the surface 19, by a space designated 23, and they are separated from each other on the top of the sensor 17. The insulation 21 provides the spacing of the wires above the surface 19.

The wires 22 extend around the member 18 and are connected together at a connector 24 below the member 18. A common lead wire 26 extends from the common connector 24, as shown in FIG. 5. Also, the wires 22 are secured to and supported on the member 18 by an electrical insulation 27 which extends along the bottom surface 28 of the member 18 and around the ends thereof as shown. Of course the showing in FIGS. 4 and 5 is of only a little more than one-half of one of the sensors 17a and the like.

The member 18 is made of an electrical conductor material, and FIGS. 2 and 3 show an electrical connector designated 29 which is connected to the wires 26 extending from each of the sensors. Also, a wire 31 extends into the connector 29 and is connected to the mounting bar 16 to provide the ground connection or wire.

At this point it will now be understood that when the web of paper sags, as indicated by dot-dash lines in FIG. 3, the fine electric wires 22 are pressed against the member 18 to complete an electric circuit through the member 18. This event can operate a signal so that the operator will know that the paper has sagged as it passed over that particular sensor.

Of course the movement and weight of the paper will be sufficient to deflect the wire 22 and cause it to make contact with the member 18 when the paper sags. The wires may differ in cross-sectional size and material, depending upon the paper web they are intended to sense. For example, when sensing paper of from forty to eighty pound weight, wires may have a diameter of .005 inch and be round and made of steel. In the operation of the wire contacting the bar 18, the sensor is acting as an electric switch.

As previously mentioned, the method and apparatus may be utilized to simultaneously monitor or detect sag in two webs of paper being fed into a press simultaneously. Also, the sensors can of course be adjusted to detect varying degrees of sag, according to the operator's desire, so that only a small amount of sag can be detected or only a larger amount can be detected. This is simply accomplished by vertical displacement of the sensor 17 to control the spacing of the wires 22 from the bottom surface of the paper passing thereover.

The sensors are preferably operated at from 12 to 24 volts direct current and are connected into amplifiers to permit sensing at low voltage and current to provide for sensing at relatively high contact resistances. Also, the invention has what is termed three modes of operation, namely, a monitor mode, a scan mode, and a record mode.

FIG. 7 shows two sets of the apparatus, with each set serving say one of two webs being fed into a press. Here the four sensors 17 in each set are connected in parallel by the wire 31, and this of course makes all of the four sensors act as one sensor spanning the entire width of the web. The sensors 17 are in turn connected to a wire 32 to a combined amplifier and relay indicated at 33. This in turn is connected to a wire 34 to a counter indicated at 36, and the counter 36 counts the events or electrical impulses caused by any one of the sensors 17 being actuated or closed by the sagging web of paper. Another wire 37 connects the counter 36 to a visual signal or light designated 38 which of course signals the operator of the events or occurrences of sag. This is what is termed the monitor mode of the invention, and at this time it does not indicate where in either the width or length of the paper the sag is occurring, since all the sensors are simply connected in parallel.

FIG. 8 shows the apparatus for the record mode, and here it will be seen that the sensors 17 are again connectable to the amplifier and relay designated 33. Also, in this instance, the counter 36 and light or signal 38 are utilized, along with additional signals or lights designated 39, with one for each of the respective four sensors 17 on each paper web. FIG. 8 indicates that the upper one of the sensors 17 is connected to the amplifier 33, and the remaining seven sensors are connected in parallel. This would of course indicate that the upper one sensor 17, which may be the sensor 17d of FIG. 2, is being actuated buy the sagging paper. Thus the upper one of the lights 39, along with the light 38 would be energized to indicate this condition.

FIG. 8 shows that a second amplifier 41 is connected to the remaining seven sensors 17 through a wire 42. This amplifier is connected to a stepping relay 43 through a wire 44. The contacts of the stepping relay 43 are conventional and are such that when any one of the remaining seven sensors is detecting bagginess or sag, it will cause the relay to step to its next position and connect the next sensor to the amplifier 33. In turn, the remaining seven sensors will be connected in parallel to the amplifier 41. The stepping action will then continue when there is sagging until the sensor detecting the sag is caused to be connected to the amplifier 33, and then there can be no further stepping action and thus the proper sensor is found, and its corresponding signal 39 is energized. This is the searching and homing of the sensor which is detecting sag, and the apparatus will remain in this condition until it is returned to the monitor mode, or another sensor detects sag.

Further, the corresponding recorders are provided and operative to record the sag on paper tape designated 46. Thus markings 47 are shown on the upper tape 46 to show that the upper sensor 17 was detecting sag. The recorder driving motor 48 is connected in the circuit by wire 49 and rolls the tape 46 for the marking, for instance through the connection 51, all in any conventional manner. FIGS. 7 and 8 being diagrammatic, it is to be understood that adequate wiring for functions described is employed.

Without the recording apparatus, such as the recording motor 48 and the tape 46, the apparatus is in what is described as the scan mode.

It is obvious that the method of detecting sag has been heretofore disclosed and described. That method included the description of moving a sheet in its plane or edgewise past a sensor or feeler means or other means responsive to sag of the paper out of its normal plane. The sensing or detecting of sag actuates the sensor in accordance with the sag, and such actuation may be periodic impulses in the electrical system so that the appropriate flashing of a signal light or recording on a paper tape may be made. Further, with the utilization of a plurality of sensing means distributed across the width of the paper web, the location of the sag in the web can be found, and this location can also be recorded on the paper tape which is then made of record and useful in disclosing wherein the particular web of paper was irregular and contained sag.

Figure 10:
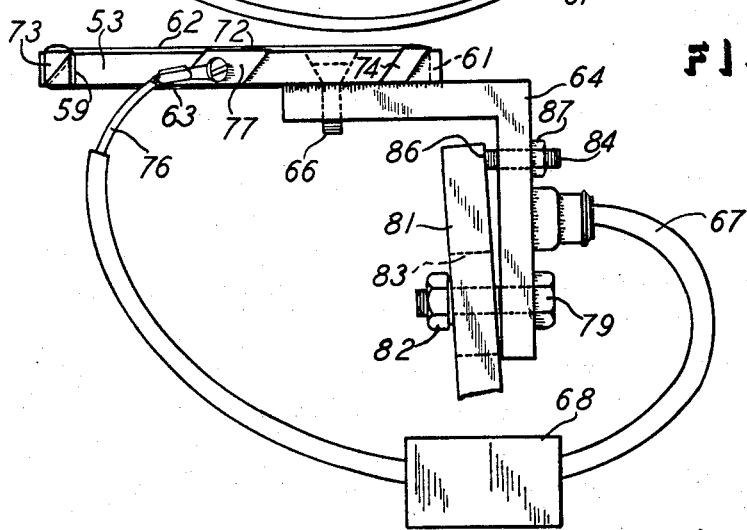
FIG. 10 is an end elevational view of FIG. 9.

Another embodiment of the sensor portion is shown in FIGS. 9 and 10 where as sensor generally designated 52 is shown. The sensor is shown to consist of a planular piece 53 having fine electrically conducting wires 54 threaded therearound. Thus it will be seen that the wire 54 is one continuous piece having its end 56 wrapped around the member 53 in the slot 57, and the other end of the wire 58 is wrapped around a slot 59 in the member 53. Thus the wire extends endlessly along the member 53 and is threaded in the slots generally designated 61 and located on opposite forward and trailing edges of the member 53. The wire 54 therefore extends above and below the member 53 in lengths designated 62 and 63 respectively.

It will therefore be understood that the sensor 52 can be substituted for the sensor 17, and the longer dimension of the sensor 52 will extend in the direction of the width of the paper web 13, just as in the case of the sensor 17. Also, there will be preferably four sensors 52, just as there are four sensors 17, and the other wiring and mounting and connection of the sensors are apparent through reference to the wiring in the other embodiment and through the hereinafter described mounting for the embodiment in FIGS. 9 and 10.

It will therefore be noted that the portion 62 of the wire 54 is extended oblique to the direction of travel of the web 13, and is shown at 45 degrees thereto. This therefore means that the web will be running at an angle with respect to the wire 62, but not transverse thereto as in the embodiment of FIG. 4. The wire 54 is thus less likely to be broken, and is in fact sensitive at all of its points or length extending across the top of the member 53. Further, the wire is arranged that actually every other wire alone in its portion 62 provides full coverage across the top of the member 53 by virtue of the spacing between the wire portions 62 and the angularity described.

The member 53 is a non-conducting material, and is supported on a mounting bar 64 which is of a conducting material. Screws 66 extend through the member 53 and into the member 64 as shown to secure the two pieces together. Also, the portions 63 of the wire 54 extend in direct contact with the electrical conducting member 64, and thus each strand or portion 63 of the wire 64 is complete in itself and if anyone were to break the others would still be operative.

The member 64 is at ground potential electrically, and thus the wire portions 63 are also at ground potential. Further, the member 64 is connected to a wire 67 to a connector box 68, as shown.

An electrical conductive material 69 extends across the top surface 71 of the member 53. The material 69 may be a metallic tape which is sufficiently thin so that it does not normally contact the wire portion 62. FIG. 10 shows that the wire portions 62 have a space 72 between themselves and the top surface of the member 69 so there is no physical contact normally therebetween. Non-conductive tapes 73 and 74 are also extended over the top surface 71 to elevate the wire portion 62 above the surface 71 and above the member 69 as described.

The electrical conductor 69 has a wire 76 electrically connected thereto and extending into the box 68 as shown. The tape 69 extends over the edge of the member 53, as shown at 77, but does not at the opposite end designated 78. This therefore provides electrical contact between the tape 69 and the wire 76. Also, when the series of the sensors 52 are spaced endwise, the ends 78 are not in contact.

It will now be understood that when the web of paper sags so that it contacts any one of the wire lengths 62, it will depress the length 62 and cause it to make contact with the metallic tape 69 and, thus complete the circuit through the wire 76, the box 68, and the connection to the ground potential described.

The sensor 52 is mounted to have complete adjustment so that it can be aligned to a true horizontal or other desired position with respect to the paper web portion 13. A level can be attached to the mounting 64 to indicate true horizontal position of the sensor 52. Thus bolts 79 extend through the mounting member 64 and into the support 81. Nut 82 secures the pieces 64 and 81 in set position, and it will be noted that there is a vertical slot 83 in the mounting member 81 so that the ends of the member 64 can be raised or lowered for proper positioning desired. Further, a threaded stud 84 extends threadedly through the member 64 and abuts the member 81 at the location designated 86. This permits the member 64 to be tilted fore or aft with respect to the direction of movement of the web 13 so that the sensor 52 can be likewise tilted to the desired position with respect to the web 13. A locknut 87 is on the stud 84 for securing the member 64 in the desired position of tilt. Thus it will be understood that the member 81 is a rigid or fixed member, and the bolt 79 and adjusting screw 84 provide for the respective adjustments described so that the member 64 and likewise the sensor 52 can be adjusted as desired.

FIGS. 11–14 show a preferred embodiment of the sensor, and FIG. 11 shows a sensor similar to the sensor designated 17 in FIG. 2. Thus the sensor in FIG. 11 is designated 91, and it has four sections 91a, 91b, 91c, and 91d, and these are similar to the sections designated 17 in FIG. 2, and each of the four sections has separate wiring, as indicated by the wires 92a, 92b, 92c, and 92d. These are of course comparable to the wires 26 in FIG. 2. Further, it will be understood that the sensor 91 has a body piece 93 which is the shown channel, and it can be mounted beneath the paper web by means of the plates 94 and 96, and the channel 93 would be electrically connected, such as forming the ground connection by means of a wire such as the wire 31 in FIG. 3.

The four sections mentioned consist of the mounting blocks 97 which are not electrically conductive, and it supports upstanding feelers 98, with each section being shown to have seven such feelers. These feelers 98 are of a fine wire material having the upper end formed in a loop designated 99, and it is this loop that extends to the highest point in the sensor and is contacted by the sheet when the latter sags. Such is shown in FIG. 12 where a sheet designated 101 is shown in a solid line to be in a straight disposition, while the dot-dash line shows the sheet 101 to have sagged to where it will contact the feeler 98. When the sheet 101 is moving in the direction of the arrow designated A in FIG. 12, the feeler is sufficiently flexible to be displaced to where its shank 102 contacts the edge 103 of the sensor channel 93. Actually, the edge 103 is shown to have a cap of a stainless steel material indicated 104, and this avoids pitting and erosion of the channel 93 which commercially could be made of an aluminum material. Of course when the feeler 98 contacts the edge 103, then the electrical connections are arranged so that a signal is sent to the signaling and recording apparatus previously described so that the sag in the sheet 101 will be detected.

The mounting blocks 97 are adjustably secured to the channel 93 by means of the screws therebelow, such as the screw 106, which passes through the elongated slot 107 shown in FIG. 13. Thus the blocks 97 and their mounted feelers 98 can move toward and away from the edge 103, as desired. The feelers 98 are in turn mounted on the blocks 97 by means of screws 108 which pass through loops 109 in the feelers 98. Further, the arrangement is such that the feelers 98 are shaped so that their deflection as imposed by the sagging sheet 101 is permitted by the feeler section 111 which is then in torsion when the shank 102 is deflecting. This therefore of course avoids repeated bending of the feeler 98. The feeler portion 111 actually extends below a supporting strip 112 which is electrically conductive and which has an upper lip 113 normally in engagement with the feeler shank 102 to maintain the feeler at the selected spacing form the edge 103 for sensitivity of the sensor. Thus the respective feeler sections 91a through 91d each have a separate mounting plate 112 to which is respectively connected the wires 92a through 92d by means of an attaching screw 114 on each of the plates 112. The plates 112 are electrically separated.

In operation, any one of the feelers 98 which is deflected by the sheet 101 to where it contacts the electrically conductive edge 103, this will create a signal in the apparatus previously described. This of course indicates that the sheet 101 has sagged to a point where it contacts and deflects the feeler 98, as the latter is disposed.

With this preferred embodiment of sensor as shown in FIGS. 11–14, the web is not likely to engage the wires or feelers of the other embodiments to where the wires may be torn or the web itself may be torn. This is particularly important where the web has a spliced or pasted section hanging down to where it can engage the wires of the previously described embodiments. Further, this arrangement provides for a simpler construction and assembly, and also in operation dirt cannot hamper the operation of the feelers since any dust or dirt falling from the web will simply fall into the channel 93 or at least it will fall away from the feelers 98 and will not be able to build up on the sensor body or the wire to hamper operation. Still further, the feelers 98 are of low mass and sufficiently flexible to be readily moved, but they are not affected by air currents created by a fast-moving sheet. Also, they offer a point contact for electrical purposes, and this is preferred.

This apparatus can thus be used to warn of impending web breaking which frequently follows sag in a web. Also, the paper mill detecting sag can employ apparatus to correct sag. It will also be understood that this method and apparatus can be used to detect sag in a sheet or web of any material, including metal, plastic, fabric, and mesh.

While a specific method and certain apparatus have been described herein, it will be apparent that certain changes can be made in the method and apparatus, and the scope of this invention should therefore be determined by the appended claims.

What is claimed is:

1. Apparatus for detecting sag in a sheet which is moving edgewise in the direction transverse to the width of said sheet, comprising sensing means disposed below said sheet and including a plurality of separate feelers spaced apart across said width and within the limit of sag to be detected and being operative in response to sag in said sheet and to be actuated thereby, and a plurality of signaling means operatively separately connected to respective ones of said feelers for signaling the actuation of said sensing means to detect sag and locate it across said width.

2. The subject matter of claim 1, and for use for detecting sag in a web of paper moving edgewise in its own plane, wherein said sensing means is an electrically operated sensor disposed below said web, said sensor being adapted to be electrically actuated in response to contact by said paper when the latter sags, and wherein said signaling means is an electrically operative signal means electrically connected to said sensor and adapted to be operative in response to actuation of said feelers for signaling the sag in said web.

3. The subject matter of claim 2, including a recorder electrically connected to said sensing means and adapted to record the actuation of said sensing means.

4. The subject matter of claim 1, wherein said sensing means includes an electrical conductor member and said feelers are each a fine wire strung spaced above said conductor member and adapted to contact said conductor member when said sheet sags onto said wire and thereby create an electric signal in said conductor member.

5. The subject matter of claim 4, wherein said electrical conductor member has an upper curved surface parallel to said sheet and with the curvature extending about an axis transverse to the direction of sheet movement, and said fine wires are strung spaced apart and above said conductor member parallel to said axis and adapted to contact said conductor member when said sheet sags onto any one of said wires and thereby create an electric signal in said conductor member.

6. The subject matter of claim 4, wherein said conductor member has a flat surface disposed parallel to said sheet, and said fine wires are strung spaced above said flat surface at an acute angle with respect to the movement of said sheet and adapted to contact said conductor member when said sheet sags onto said wires and thereby create an electric signal in said conductor member.

7. The subject matter of claim 1, wherein said feelers are a plurality of upstanding electrical conducting flexible wires and said sensing means includes a contact member spaced from said wires and within the limit of flexing of said wires for making electric contact with said wires when the latter are flexed by the sagging sheet.

8. The subject matter of claim 7, wherein said contact member is located on the downstream side of said feelers with respect to the movement of said sheet.

9. A method of detecting sag in a sheet, comprising the steps of moving said sheet edgewise in its own plane in the direction transverse to the width of said sheet, electrically sensing sag in said sheet at a plurality of separate spaced-apart locations across said width by moving said sheet above an electric sensor which includes a plurality of feelers spaced apart across said width and normally spaced from said plane within the limit of sag to be detected in said sheet so that when said sheet sags anywhere across said width it will physically contact the respective one of said feelers disposed directly below the sagging portion of said sheet, said sensing being by said physical contact and electric and by sliding said sheet over said feelers in a manner that said sheets are free of marking and tearing, and separately electrically signaling the contact of the respective one of said feelers by said sheet to find where the latter sags across its width.

10. The method of claim 9, including the step of electrically recording said physical contact on a readable recorder.

References Cited

UNITED STATES PATENTS

| | | | |
|---|---|---|---|
| 2,304,645 | 12/1942 | Keeler | 73—160 |
| 2,569,442 | 10/1951 | Anderson | 200—61.18 XR |
| 3,018,659 | 1/1962 | Brown | 73—160 XR |
| 3,037,381 | 6/1962 | Grant et al. | 73—159 |
| 3,141,329 | 7/1964 | Canning | 73—160 |
| 3,181,354 | 5/1965 | Cashore | 73—159 |
| 3,316,760 | 5/1967 | Ward | 73—159 |

DAVID SCHONBERG, *Primary Examiner.*

LOUIS R. PRINCE, *Examiner.*

JEFFREY NOLTON, *Assistant Examiner.*